US012310900B2

(12) United States Patent
King

(10) Patent No.: US 12,310,900 B2
(45) Date of Patent: May 27, 2025

(54) TRACTOR DRIVEN ASSISTED MOBILITY SYSTEM, DEVICE AND METHOD

(71) Applicant: James Leroy King, Bella Vista, AR (US)

(72) Inventor: James Leroy King, Bella Vista, AR (US)

( * ) Notice: Subject to any disclaimer, the term of this patent is extended or adjusted under 35 U.S.C. 154(b) by 909 days.

(21) Appl. No.: 17/449,672

(22) Filed: Oct. 1, 2021

(65) Prior Publication Data

US 2022/0117806 A1 Apr. 21, 2022

Related U.S. Application Data

(60) Provisional application No. 63/093,603, filed on Oct. 19, 2020.

(51) Int. Cl.

| | |
|---|---|
| ***A61G 5/04*** | (2013.01) |
| ***A47L 9/00*** | (2006.01) |
| ***A47L 9/28*** | (2006.01) |
| ***A47L 9/32*** | (2006.01) |
| ***A47L 11/40*** | (2006.01) |
| ***A61G 5/10*** | (2006.01) |

(52) U.S. Cl.

CPC .............. *A61G 5/047* (2013.01); *A47L 9/009* (2013.01); *A47L 9/2831* (2013.01); *A47L 9/2852* (2013.01); *A47L 9/325* (2013.01); *A47L 11/4011* (2013.01); *A47L 11/4061* (2013.01); *A47L 11/4066* (2013.01); *A61G 5/1051* (2016.11)

(58) Field of Classification Search

CPC ....... A61G 5/047; A61G 5/1051; A47L 9/009; A47L 9/2831

See application file for complete search history.

(56) References Cited

U.S. PATENT DOCUMENTS

| | | | | | |
|---|---|---|---|---|---|
| 4,386,672 | A * | 6/1983 | Coker | A61G 5/047 | 180/907 |
| 4,503,925 | A * | 3/1985 | Palmer | A61G 5/047 | 180/13 |
| 5,016,720 | A * | 5/1991 | Coker | A61G 5/0825 | 74/105 |
| 5,494,126 | A * | 2/1996 | Meeker | A61G 5/047 | 180/907 |
| 5,651,422 | A * | 7/1997 | Casali | B62B 5/0026 | 180/907 |
| 7,976,049 | B2 * | 7/2011 | Chiu | A61G 5/047 | 180/13 |
| 8,684,113 | B1 * | 4/2014 | Laconis | A61G 5/047 | 180/11 |
| 9,326,901 | B2 * | 5/2016 | Conte | B62B 3/0612 | |
| 2006/0000664 | A1 * | 1/2006 | Huang | A61G 5/1051 | 180/907 |
| 2020/0085652 | A1 * | 3/2020 | Menig | A61G 5/1051 | |

* cited by examiner

*Primary Examiner* — Jacob D Knutson

(57) ABSTRACT

A system, device, and method for adapting a self-leveling tractor platform to provide powered mobility to a manual wheelchair. The system includes a universal adapter bracket which can be attached to a variety of wheelchairs and then coupled by a specialized latching mechanism to a self-leveling platform having multiple degrees of freedom controlled by the intuitive rotating and tilting of an attached control stick. The platform and control stick can be easily detached and used as a walking mobility aid.

14 Claims, 9 Drawing Sheets

TRACTOR DRIVEN ASSISTED MOBILITY SYSTEM, DEVICE AND METHOD

CROSS REFERENCE TO RELATED APPLICATION

This application claims the benefit of U.S. Provisional Patent Application No. 63/093,603, filed Oct. 19, 2020, titled TRACTOR DRIVEN ASSISTED MOBILITY SYSTEM, DEVICE AND METHOD, the contents of which are incorporated herein.

TECHNICAL FIELD

The present invention relates to assisted mobility devices.

BACKGROUND OF THE INVENTION

Powered wheelchairs and scooters, and related appliances, while stable, are heavy, cumbersome and require significant space to transport. Hence, they require a rack or elevator to load into a vehicle or for transport. There are a number of manual wheelchairs which are not mobility assisted. These include a manual wheelchair, caregiver pushed transport chair, and bariatric wheelchair. These wheelchairs may also be designed so that they can be folded or disassembled for ease of transport. As used herein, each of these is referred to as a wheelchair. Walking canes are lightweight but have their own disadvantages. Walking canes are unstable as they in the air at least 40-50% of the time when in use. Cane airtime depends on gait length, speed of the walker speed of the cane's forward swing time. Canes also do not provide any opposite hand lateral support. If a user is right-handed the canes does not provide any lateral left-hand support. The present invention can be used by anyone with balance and mobility issues. With the US population aging there are many more elderly people who require a mobility device that provides independence. The tractor-driven assisted mobility device does this very economically by incorporating the single-wheel powered self-leveling platform tractor into a wheelchair.

U.S. Pat. No. 8,925,563 B2 discloses a robotic cane wherein the motorized wheel comprises an omni-directional wheel. U.S. Pat. No. 7,479,872 B2 discloses a transporting oscillating alarm. U.S. Pat. No. 7,370,713 B1 discloses a personal mobility vehicle. As disclosed herein, there a plurality of features in the present invention that are not found in the foregoing patents.

SUMMARY OF THE INVENTION

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

The present invention is a system, device and method that improves the ease of and transportability of wheelchairs and provides an inexpensive device for powering wheelchairs. The invention is a self-leveling roller shoe modified to be operable as a single wheel tractor (referred to herein as a "platform" or "self-leveling platform") to be coupled to a manual wheelchair. A tee-bar handle coupled to a staff (hereafter "tactile control stick" or "control stick") can be coupled to the platform to permit steering and acceleration/ deceleration by physical manipulation of said platform. Controls such as an on/off switch are located proximate the tee-bar at the top of the control stick and the bottom of the control stick is rigidly coupled to the platform. In a further embodiment of the invention, the control stick and platform can be easily detached from the wheelchair by the operator and used as an assistive full time walking mobility device or walking aid, said detached control stick and platform providing both support and standing assistance.

In an embodiment, a removable tow bar (hereafter "universal adapter bracket") can be installed under the frame of a wheelchair using a quick release mechanism that is rigidly coupled to the bottom of the wheelchair. The platform can include a quick release mechanism to allow the user to easily attach and detach the platform while sitting in the wheelchair. When the platform is detached, the wheelchair again becomes a manual wheelchair.

The control stick when coupled to the platform is operable to provide a user leverage so that the user can pull themselves into a safe standing position. When standing the removed platform with the control stick combination from the wheelchair is operable to provide the user stability assistance.

BRIEF DESCRIPTION OF THE DRAWINGS

For a better understanding of the present invention including the features, advantages and specific embodiments, reference is made to the following detailed description along with the following Figures, in which.

DETAILED DESCRIPTION

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

Figure 1:
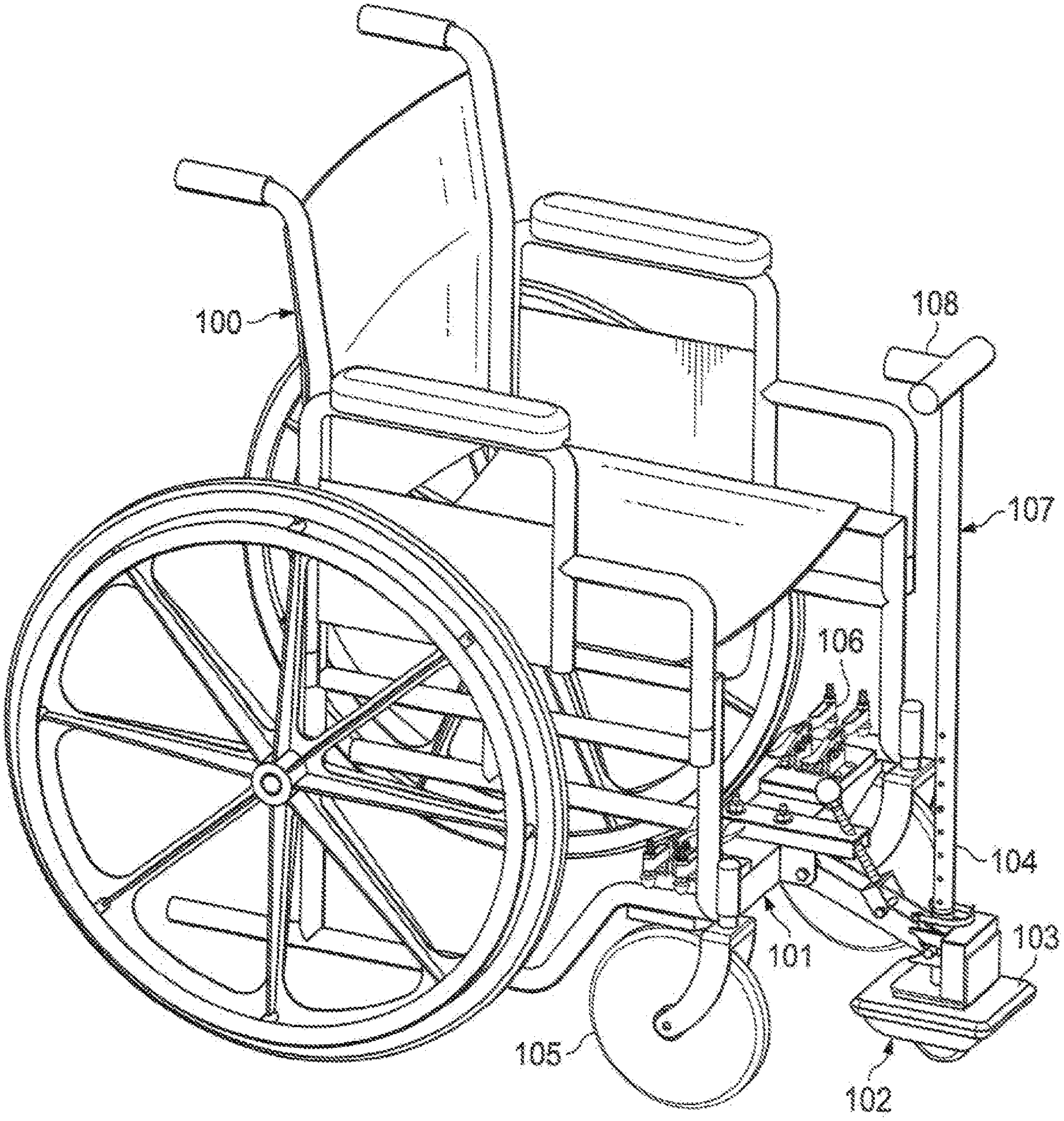
FIG. 1 is a front perspective view of the tractor driven assisted mobility system attached to a manual folding wheelchair in the preferred embodiment of the present invention.
Figure 2:
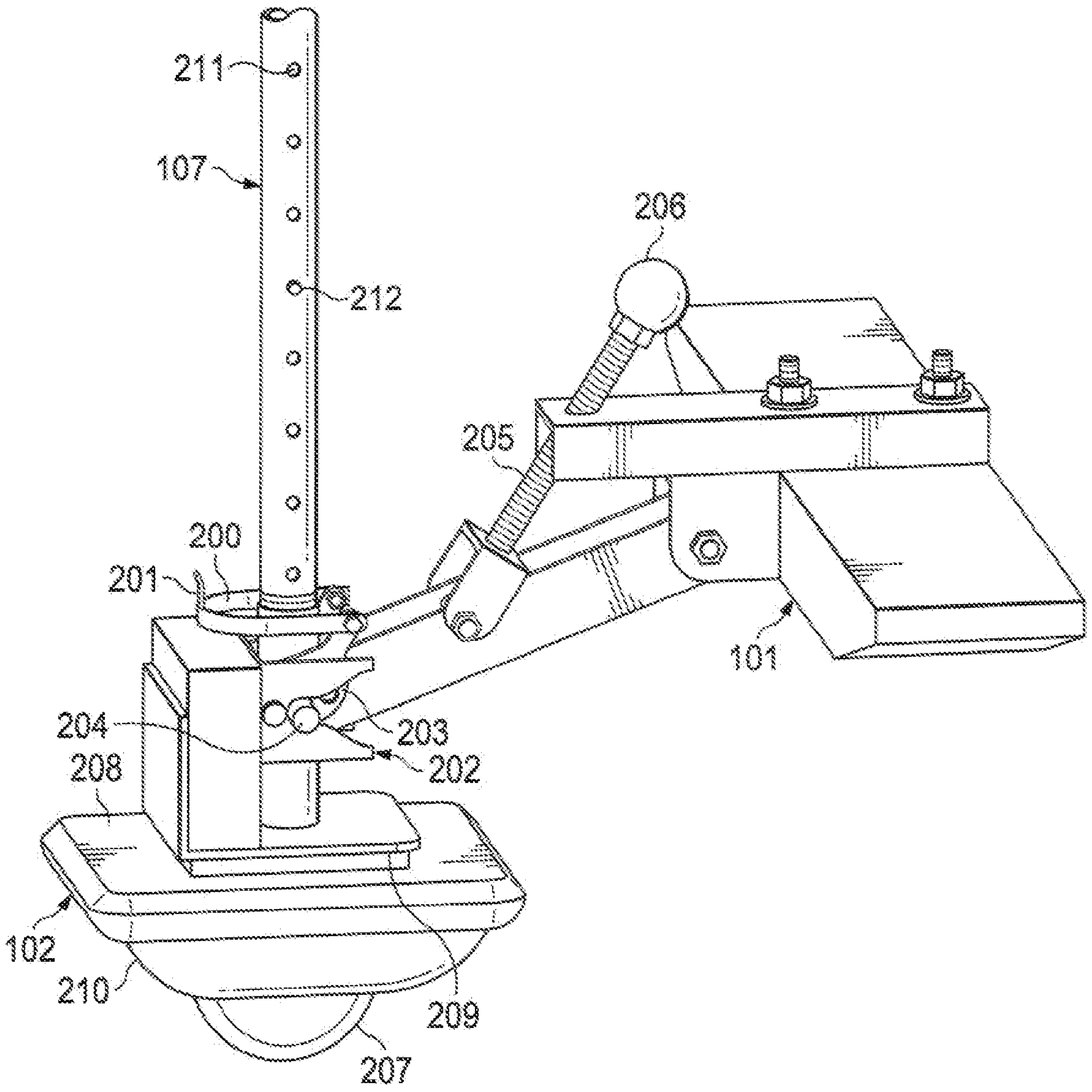
FIG. 2 is a side perspective detail view of the latch coupling mechanism between the universal adapter bracket and self-leveling platform, in the preferred embodiment of the present invention.

The present invention is a system, device and method for powering a manual wheelchair using a single-wheel tractor driven self-leveling platform (hereafter "platform" or "tractor platform") modified to be coupled to a wheelchair. Referring to FIG. 1, the system comprises a single-wheel tractor driven self-leveling platform 102, a control stick 107, and a universal adapter bracket 101. The universal adapter bracket is adjustable so that it can be fitted and secured to a variety of manual wheelchair sizes, makes and models. The operator or an assisting individual first adjusts and affixes said universal adapter bracket 101 to said manual wheelchair 100. The operator then sits in said wheelchair, places said platform 102 in front of the wheelchair and tilted toward the operator, and then couples said platform to said universal adapter bracket via a specialized latching mechanism 103. The operator then attaches said control stick 107 to said self-leveling platform 102. Using the tactile control stick as a lever, the operator tilts the combined control stick and tractor platform forward, lifting the front caster wheels 105 of the wheelchair slightly off the ground and transferring the portion of the weight usually carried by said caster wheels to the platform single drive wheel 207 via the latching axles 204.

The self-leveling platform 102 comprises a control stick attachment means, universal adapter bracket attachment means, a single wheel 207 coupled to a drive motor, a microprocessor coupled to nonvolatile memory, sensors, wireless signal receiver, battery, and associated electrical connections, and power distribution and signal conditioning circuits, said wireless signal receiver being coupled to a wireless signal transmitter located on the control stick using a communications protocol such as Bluetooth, said drive motor being controlled by said microprocessor executing sequential instructions stored in nonvolatile memory in the form of computer code operable to: frequently poll sensor values, said sensors including one or more 3-axis gyroscopes, 3-axis accelerometers, 3-axis magnetometers, tilt sensors, laser or sonar ranging devices, and/or other inertial or external sensing devices; generate a state estimate by maintaining and updating an internal state model with a weighted combination of measured sensor values and an expected state obtained by propagating dynamic motion models, the update step being performed using a method such as the Kalman filter, said state estimate including platform position and velocity vectors, angle of platform deviation from level horizontal, and angular velocity of platform about drive wheel axis of rotation, as well as commanded drive motor speed; implement a PID controller or similar control loop to determine the required drive motor direction and speed to bring the platform to a level horizontal orientation; and send the necessary commands to actuate the desired drive wheel motion.

The self-leveling platform 102 attempts to keep itself balanced in a quasi-stable orientation such that the platform, which is free to rotate about the axis of rotation of the drive wheel 207, is level with respect to the local gravity vector. To define a coordinate system, let the X-axis be a platform-fixed vector located at the center of mass of the self-leveling platform and pointing forward along the direction of motion when the platform is upright and level; let the Y-axis be a vector located at the center of mass of the platform, extending out to the left such that it forms a right angle with said X-axis and is parallel to the axis of rotation of the drive wheel; let the Z-axis be an upward-pointing vector located at the center of mass of the platform, said Z-axis being colinear with the longitudinal axis of the control stick and completing the right-handed coordinate system. By pushing the control stick away, the operator tilts the platform forward, or counterclockwise about a pivot vector parallel with the defined Y-axis, this pivot vector being the vector extending through the longitudinal axes of the latching axles 204 when captured as shown in FIGS. 3*b*-3*d*. The platform then attempts to restore a level orientation by commanding counter-clockwise rotation of the drive motor and wheel in order to effect forward motion of the platform. This forward motion of the platform causes a counter-clockwise rotation of the combined control stick and platform about the pivot vector coincident with the longitudinal axis of the latching axles 204 which must be countered by a force exerted by the operator on the control stick in order to keep the platform tilted forward and the platform controller commanding forward motion. With a standard PID controller implementation, the commanded drive motor speed depends on the angle of tilt, the amount of time the tilt is maintained, and the speed of the initial tilting motion, drive motor speed increasing in all cases with the respective quantity. The operator is thus able to control forward and backward movement by tilting and maintaining the control stick in the desired direction. Once the maintaining force on the control stick is released by the operator, allowing the platform to come to a level horizontal orientation, commanded drive wheel speed approaches zero and wheelchair movement stops.

The control stick 107 comprises a handle 108 at its upper end dimensioned as a tee-bar with symmetric lateral extensions and a backward extension such that the control stick can be easily rotated about its longitudinal, or vertical, axis; said control stick further comprises controls such as a self-leveling platform on/off switch, a wireless transmitter coupled to the wireless receiver located in said platform, a battery, and associated power distribution and signal conditioning circuitry; the control stick further comprises a secondary handle 400 along its length, said secondary handle being repositionable and used to aid an operator in transitioning from a standing to sitting position or vice versa by providing additional leverage.

In a preferred embodiment, the specialized latching mechanism used to couple the platform to the universal adapter bracket is such that, when the same are coupled, the combined control stick and platform housing 210 are free to rotate about an axis aligned and coincident with the longitudinal axis of the control stick without effecting rotation of the combined universal adapter bracket and wheelchair. To achieve this, said platform 102 comprises between the latch mechanism baseplate 209 and the platform housing upper surface 208 a bearing assembly 301 allowing free rotation of the combined control stick 107 and platform housing 210 relative to the latching mechanism. In this embodiment the operator is able to change the direction the wheelchair is facing by rotating the control stick and then tilting the control stick. The wheelchair is then pulled by the platform and rotated in the desired direction.

In the preferred embodiment, said control stick attachment means is a locking spring-loaded pin, said control stick comprising for its lower portion a hollow cylindrical length having vertically regularly spaced through-holes 211 extending radially in one direction from the control stick longitudinal axis; said platform comprising a solid cylinder extruding from its upper surface, said solid extruded cylinder dimensioned to be received by the hollow control stick length, said extruding solid cylinder comprising a spring-loaded pin 212 extending radially outward and dimensioned to fit through the through-holes 211 of the control stick. The spring-loaded pin is depressed by the operator who then aligns and lowers the control stick hollow lower length over the depressed pin and extruding solid cylinder until the desired control stick height is reached, at which point the control stick is rotated to align the depressed pin with a through hole, allowing the spring-loaded pin to extend through the through hole, locking the control stick and platform together and fixing their relative positions and orientations.

In another embodiment, the platform-control stick attachment means is a screw, the control stick comprising at its lower end a length of external threading, the platform comprising a corresponding extruded hollow cylinder having internal threading and being dimensioned to receive said threaded end of the control stick, said control stick being secured to said platform by aligning the longitudinal axes of said control stick and said corresponding extruded hollow cylinder and then rotating the control stick about its longitudinal axis such that the threads are interlocked through their full length.

In a preferred embodiment of the present invention, the universal adapter bracket 101 (hereafter "bracket") is secured to a manual wheelchair 100 by releasable wheelchair attachment means 106, said bracket being positioned such that it spans the space between the left and right front caster wheels 105 of a manual wheelchair; said bracket further comprises one or more securable sliding mechanisms operable to lengthen or shorten the lateral dimensions of said bracket in order to accommodate a variety of wheelchair sizes, makes, and models; said securable sliding mechanism comprising in one embodiment sliding frames dimensioned to fit one inside the other, the inner frame being partially inserted into the outer frame, said inner and outer frames having length-wise slotted cutouts through which a securing nut and bolt is placed and tightened, preventing relative movement of the inner and outer frames; said bracket comprises releasable wheelchair attachment means 106 at both lateral ends of said bracket, each of said releasable wheelchair attachment means comprising in the preferred embodiment of the present invention a semi-cylindrical depression 700 inset in the bracket upper surface for receiving the frame of a manual wheelchair, specifically the portion of the frame just behind the wheelchair front caster wheels; each of said releasable wheelchair attachment means further comprising one or more levered toggle clamps 401, each clamp having a rubber stopper 400 coupled to a handle 402 via a force-multiplying lever mechanism, said handle operable when pressed to securely clamp a wheelchair frame between said rubber stoppers 400 and said semi-cylindrical depression 500; said universal adapter bracket further comprises a latching assembly positioned in the lateral center of said bracket and extending forwards, said latching assembly corresponding to a complementary latching mechanism on said self-leveling platform and comprising a latching axle or axles 204 and means for adjusting the positioning of said latching axle or axles relative to the ground, said adjustment means being in the preferred embodiment a screw-drive 205 coupled to a knob 206 or wheel.

Figure 8:
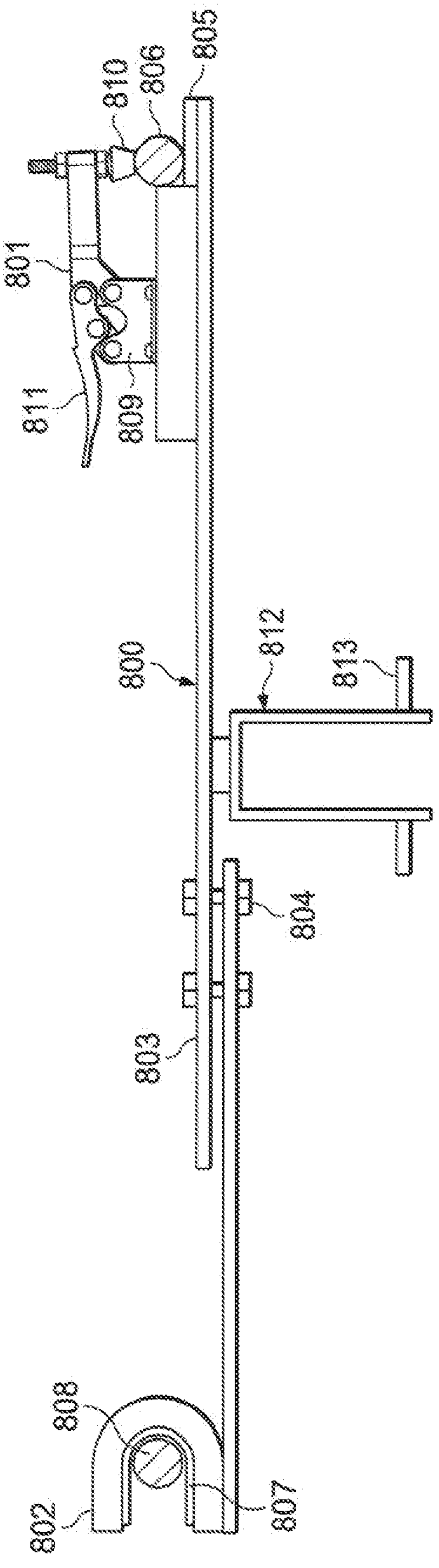
FIG. 8 is a top-down view of the universal adapter bracket, in an alternate embodiment of the present invention.

In another embodiment of the present invention, referring to FIG. 8, the universal adapter bracket 800 is secured to a manual wheelchair by releasable wheelchair attachment means 801, said bracket being positioned such that it spans the space between the left and right front caster wheels of a manual wheelchair; said bracket further comprises one or more securable sliding mechanisms 803 operable to lengthen or shorten the lateral dimensions of said bracket in order to accommodate a variety of wheelchair sizes, makes, and models; said securable sliding mechanism 803 comprising in one embodiment sliding frames dimensioned to fit one inside the other, the inner frame being partially inserted into the outer frame, said inner and outer frames having length-wise slotted cutouts through which one or more securing nuts and bolts are placed and tightened, preventing relative movement of the inner and outer frames; said securable sliding mechanism 803 comprising in another embodiment sliding frames positioned adjacent to one another, said adjacent frames having length-wise slotted cutouts through which one or more securing nuts and bolts 804 are placed and tightened, preventing relative movement of the adjacent frames; said bracket comprises releasable wheelchair attachment means 801 at one lateral end of said bracket and a wheelchair frame capture groove 802 at the opposite lateral end of said bracket; said releasable wheelchair attachment means comprising a semi-cylindrical depression or padded inset 805 in the bracket upper surface for receiving the left-most frame member 806 of a manual wheelchair, specifically the portion of the frame just behind the wheelchair front caster wheels; said wheelchair frame capture groove 802 comprising a padded inset 807 and being dimensioned to accept the right-most portion of the wheelchair frame 808; said releasable wheelchair attachment means 801 further comprising one or more levered toggle clamps 809, each clamp having a rubber stopper 810 coupled to a handle 811 via a lever mechanism, said handle operable when pressed to securely clamp a wheelchair frame 806 between said rubber stoppers 810 and said semi-cylindrical depression or padded inset 805; said universal adapter bracket further comprises a latching assembly 812 positioned in the lateral center of said bracket and extending forwards, said latching assembly corresponding to a complementary latching mechanism on said self-leveling platform and comprising a latching axle or axles 813 and means for adjusting the positioning of said latching axle or axles relative to the ground, said adjustment means being in the preferred embodiment a screw-drive coupled to a knob or wheel. In this embodiment, said bracket 800 is secured to said wheelchair by positioning said bracket such that the right-most portion of the wheelchair frame 808 is placed in said wheelchair frame capture groove 802, the sliding frame adjustment bolts 804 are loosened, the left-most portion of the wheelchair frame 806 is secured between said padded inset 805 and said rubber stoppers 810, and the sliding frame adjustment bolts are tightened.

Figure 3A:
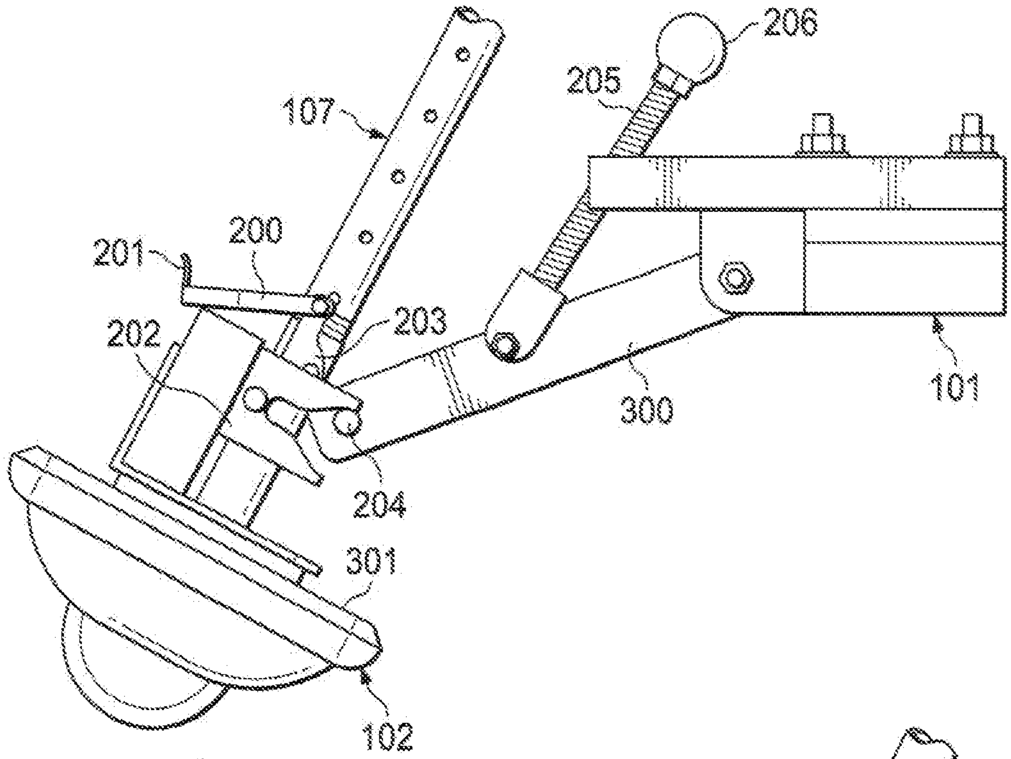
FIGS. 3*a-d* are sequential side detail views of the process of coupling the universal adapter bracket to the self-leveling platform, in the preferred embodiment of the present invention.
Figure 3B:
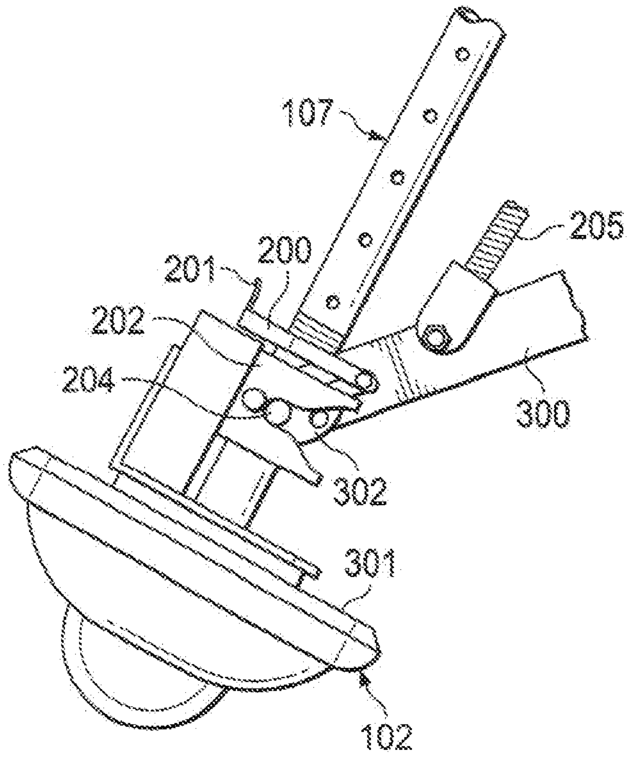
Figure 3C:
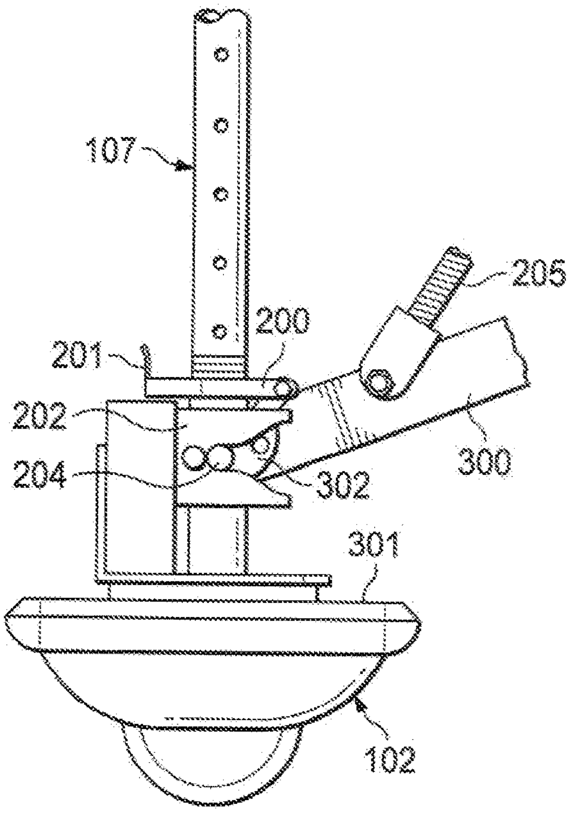
Figure 3D:
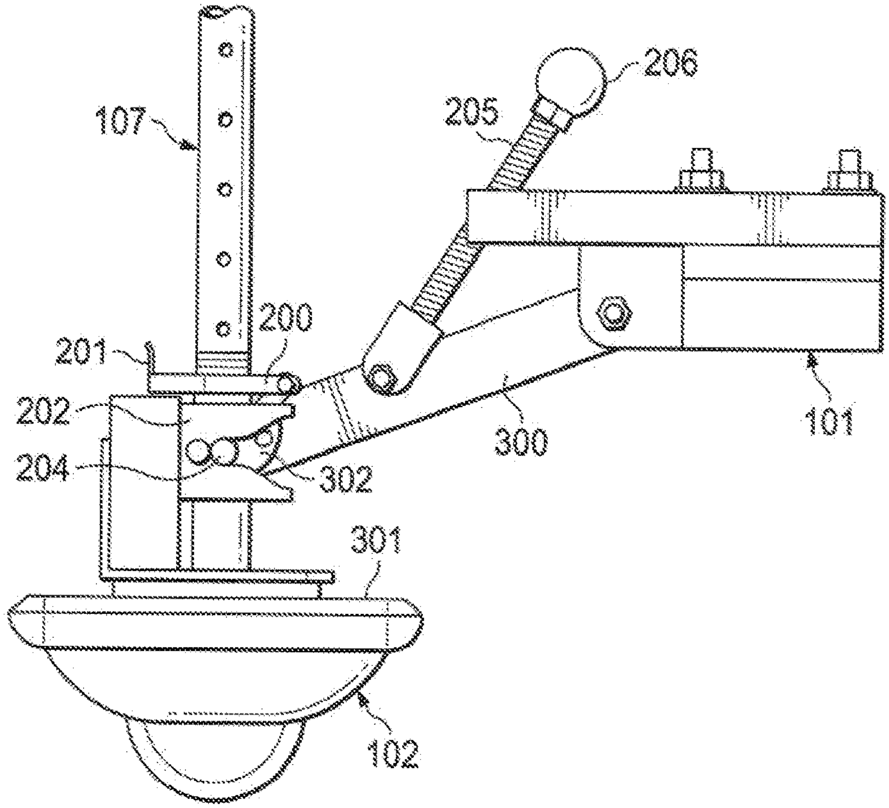
Figure 4:
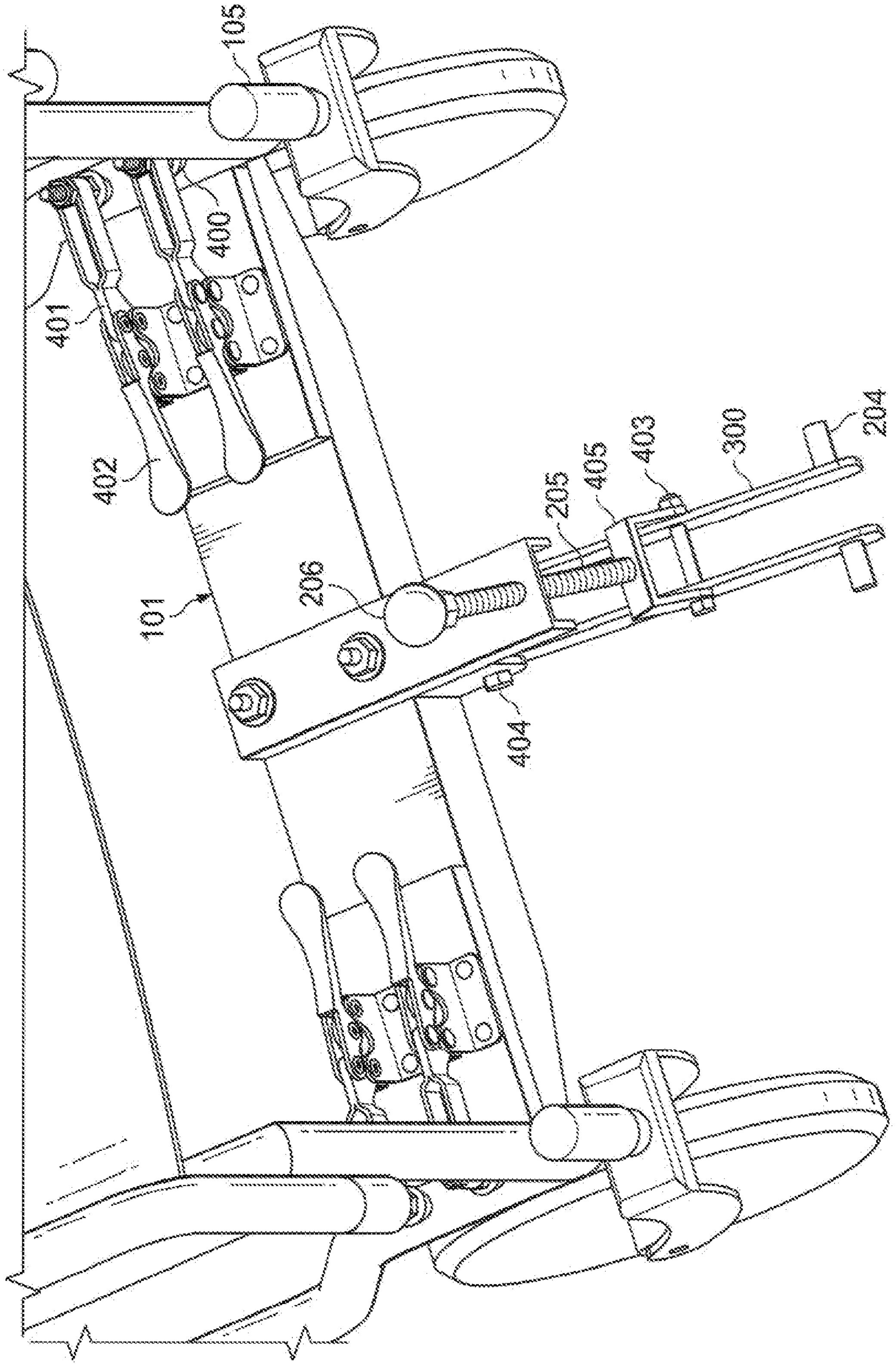
FIG. 4 is a top-front perspective detail view of the universal adapter bracket coupled to a wheelchair, in the preferred embodiment of the present invention.

Referring to FIGS. 3*a* and 4, the latching assembly of said bracket comprises a pair of mirrored latching axle support arms 300 coupled to said bracket at latching axle support arm base pivot 404, said support arms being free to rotate about the longitudinal axis of a bar inserted through both support arms and said bracket at said base pivot 404; said support arms being further coupled to a latching axle adjustment mechanism U-bracket 405 via a latching axle support arm adjustment pivot 403 through both support arms and both legs of said U-bracket, said U-bracket being further coupled via a screw adjustment mechanism 205 through a threaded hole in said universal adapter bracket to an adjustment knob 206, said threaded hole being dimensioned to receive said screw adjustment mechanism 205 such that rotation of said adjustment knob 206 effects rotation of said support arms about said base pivot 404, effectively raising or lowering latching axles 204, said latching axles being cylindrical extrusions extending outward laterally from the free end of each support arm as shown in FIG. 4.

Referring to FIG. 3*a*, the latching mechanism of said platform comprises a pair of latches 202 positioned on either side of the control stick 107, a pair of associated latch pawls 203 in the unlatched position, said pawls 203 being attached to their associated latches at respective pivot points, said pawls being further attached at respective pivot points to the ends of a common yoke band 200, said common yoke band comprising a grasping tab 201, said latches and associated pawls being dimensioned to accept the latching axles 204 of said bracket latching assembly.

In one embodiment of the present invention, said latches are gravity latches and said latch pawls are gravity latch pawls, the restoring force which actuates the latching motion being provided by gravity.

FIGS. 3*a*-3*d* demonstrate the process of coupling the platform to the bracket via the latching mechanism and latching assembly. The latching assembly is aligned with the latching mechanism as shown in FIG. 3*a*. The latching axles are moved forward into the latching mechanism until they are captured; the gravity latch pawls are shaped so that said forward motion of the latching axles pushes the gravity latch pawls upward. Once said latching axles are fully forward, gravity pulls said pawls back down behind said latching axles, locking them in place and capturing them. FIG. 3*a* shows the latching mechanism and latching assembly in close proximity but in an unlatched configuration, with the gravity latch pawls raised. FIG. 3*b* shows the gravity pawls 302 lowered in a latched configuration after having captured the latching axles, said platform being tilted toward said universal adapting bracket such that the front caster wheels of the attached wheelchair are loaded. FIG. 3*c* shows the platform being tilted away from the wheelchair, the platform-control stick system rotating about the pivot axis formed by the common longitudinal axis extending through both latching axles, said rotation acting to lift the front caster wheels of said wheelchair slightly off the ground, unloading them. The mirrored split-support arm configuration allows the control stick longitudinal axis to be centered with respect to the platform while allowing the latching axle pivot axis to be positioned vertically in line with the drive wheel rotation axis, effectively extending the latching axle pivot axis through the control stick while allowing the control stick and platform to rotate about the control stick longitudinal axis independently of the latching mechanism and coupled latching assembly, said control stick being rigidly fixed to said platform, said latching mechanism being coupled to said platform by a rotating bearing assembly 301. FIG. 3*d* shows the platform and adapter bracket in a fully upright, latched configuration. To reverse the process and detach the platform from the bracket, the grasping tab 201 is pulled forward, the common yoke band ensuring that the gravity latch pawls are raised in unison, the raised pawls releasing the latching axles so that the platform can be pushed forward away from the bracket.

In another embodiment of the present invention, said latches are spring-assisted latches and said pawls are spring-assisted latch pawls, said spring-assisted latches of said latching mechanism each comprising a spring coupling said spring-assisted latch pawl to its associated latch such that the restoring force which actuates the latching motion is provided by said coupling springs. In this embodiment, the latching assembly is aligned with the latching mechanism as shown in FIG. 3*a*. The latching axles are moved forward into the latching mechanism until they are captured; the latch pawls are shaped so that said forward motion of the latching axles pushes the latch pawls upward. Once said latching axles are fully forward, the restoring force provided by a spring coupling each of said latch pawls to a respective latch pulls said pawls back down behind said latching axles, locking them in place and capturing them. FIG. 3*a* shows the latching mechanism and latching assembly in close proximity but in an unlatched configuration, with the latch pawls raised. FIG. 3*b* shows the pawls 302 lowered in a latched configuration after having captured the latching axles, said platform being tilted toward said universal adapting bracket such that the front caster wheels of the attached wheelchair are loaded. FIG. 3*c* shows the platform being tilted away from the wheelchair, the platform-control stick system rotating about the pivot axis formed by the common longitudinal axis extending through both latching axles, said rotation acting to lift the front caster wheels of said wheelchair slightly off the ground, unloading them. The mirrored split-support arm configuration allows the control stick longitudinal axis to be centered with respect to the platform while allowing the latching axle pivot axis to be positioned vertically in line with the drive wheel rotation axis, effectively extending the latching axle pivot axis through the control stick while allowing the control stick and platform to rotate about the control stick longitudinal axis independently of the latching mechanism and coupled latching assembly, said control stick being rigidly fixed to said platform, said latching mechanism being coupled to said platform by a rotating bearing assembly 301. FIG. 3*d* shows the platform and adapter bracket in a fully upright, latched configuration. To reverse the process and detach the platform from the bracket, the grasping tab 201 is pulled forward against the restoring spring force, the common yoke band ensuring that the spring-assisted latch pawls are raised in unison, the raised pawls releasing the latching axles so that the platform can be pushed forward away from the bracket.

Figure 5:
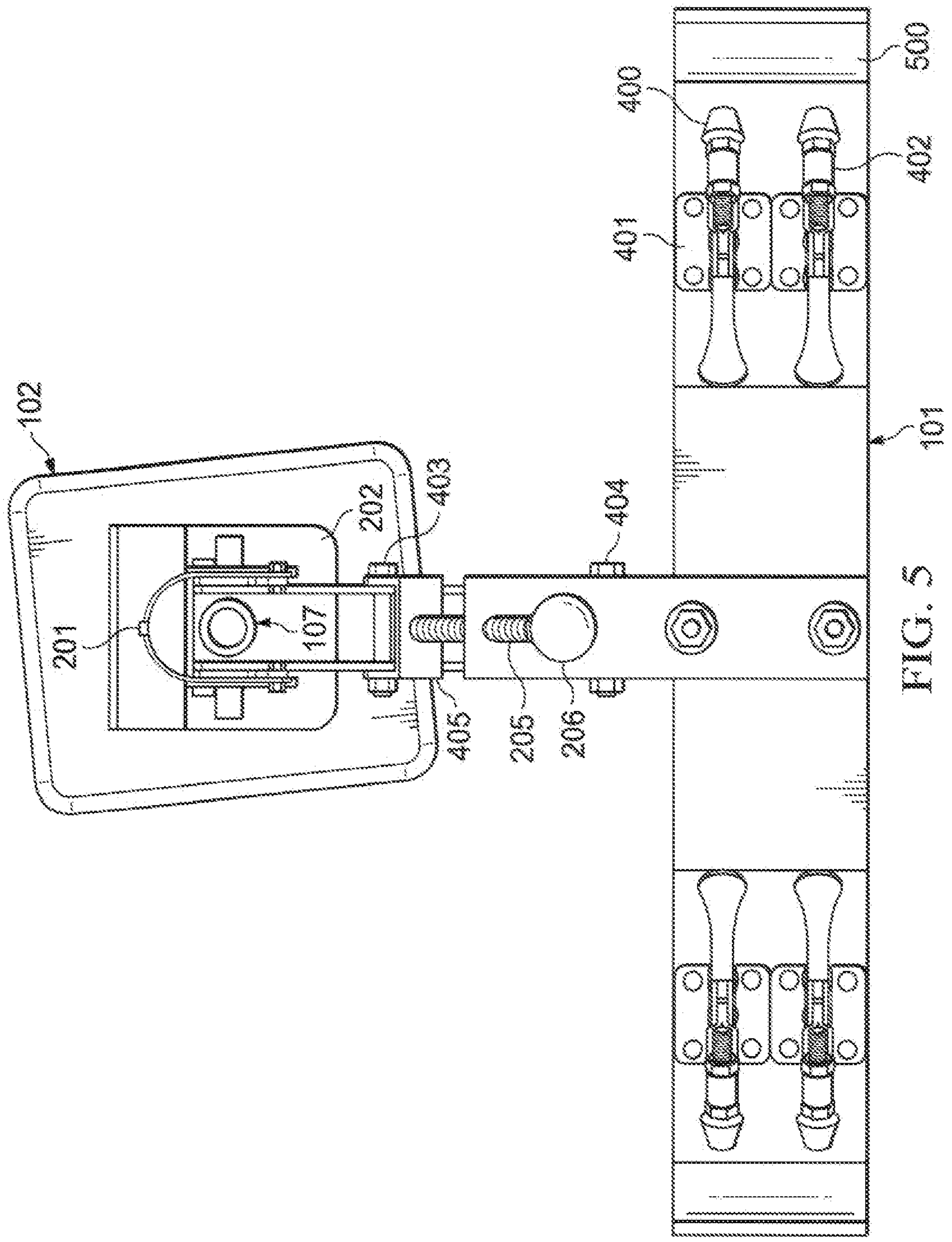
FIG. 5 is a top perspective view of the universal adapter bracket coupled to the self-leveling platform, in the preferred embodiment of the present invention.

FIG. 5 provides a top view of the adapter bracket and platform in a latched configuration, showing how the latching assembly and latching mechanism couple the adapter bracket to the platform without contacting the control stick, said control stick being free to continue through a hole in the base of the latching mechanism and through a hole in the center of a freely-rotating bearing assembly 301 to be rigidly fixed to the upper surface of the self-leveling platform.

Figure 6:
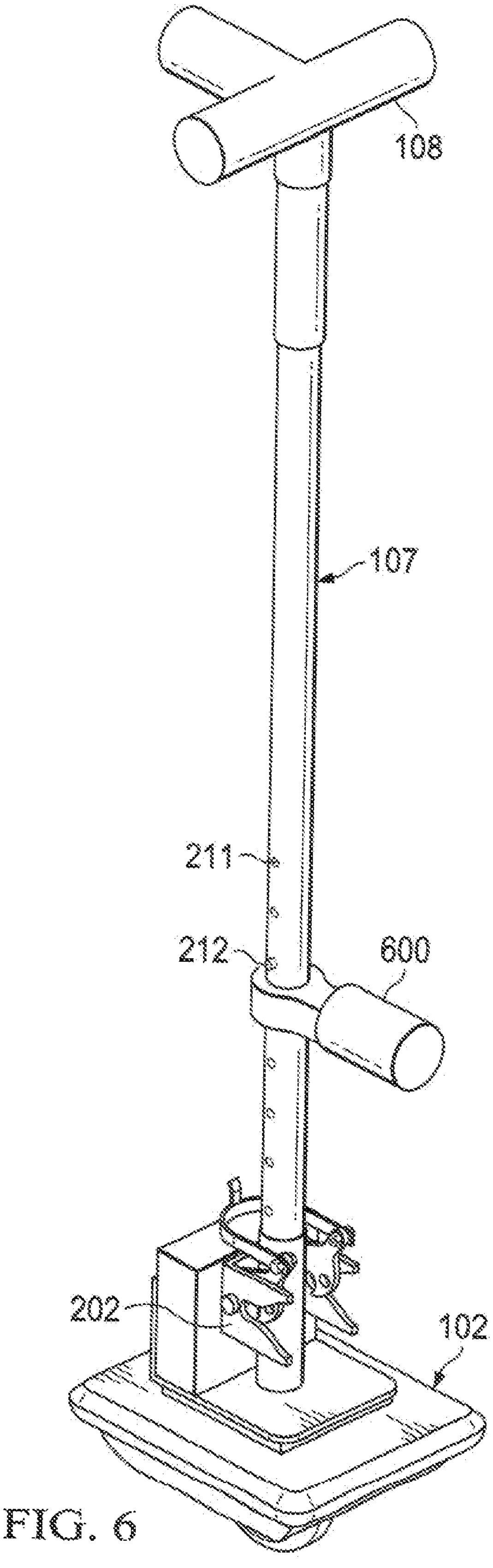
FIG. 6 is a perspective view of the detached self-leveling platform and control stick acting as a walking mobility assistance device, in the preferred embodiment of the present invention.

Referring to FIG. 6, the control stick 107 and self-leveling platform 102 can be easily detached from the adapter bracket and used as a stand-alone walking mobility aid. The standalone platform has an advantage over conventional walking mobility aids in that it does not need to be regularly lifted and re-positioned; being in constant contact with the ground eliminates vulnerable windows of time in which an operator can lose balance and suffer a fall. When walking, a user will tilt the platform and control stick slightly backwards, causing the platform to provide a reverse force for the user to lean against. When standing still the user can also lean on the torque created by the tilting the control stick backwards a small amount. The control stick comprises a secondary handle 600 to aid an operator in transitioning between standing and sitting positions.

Figure 7:
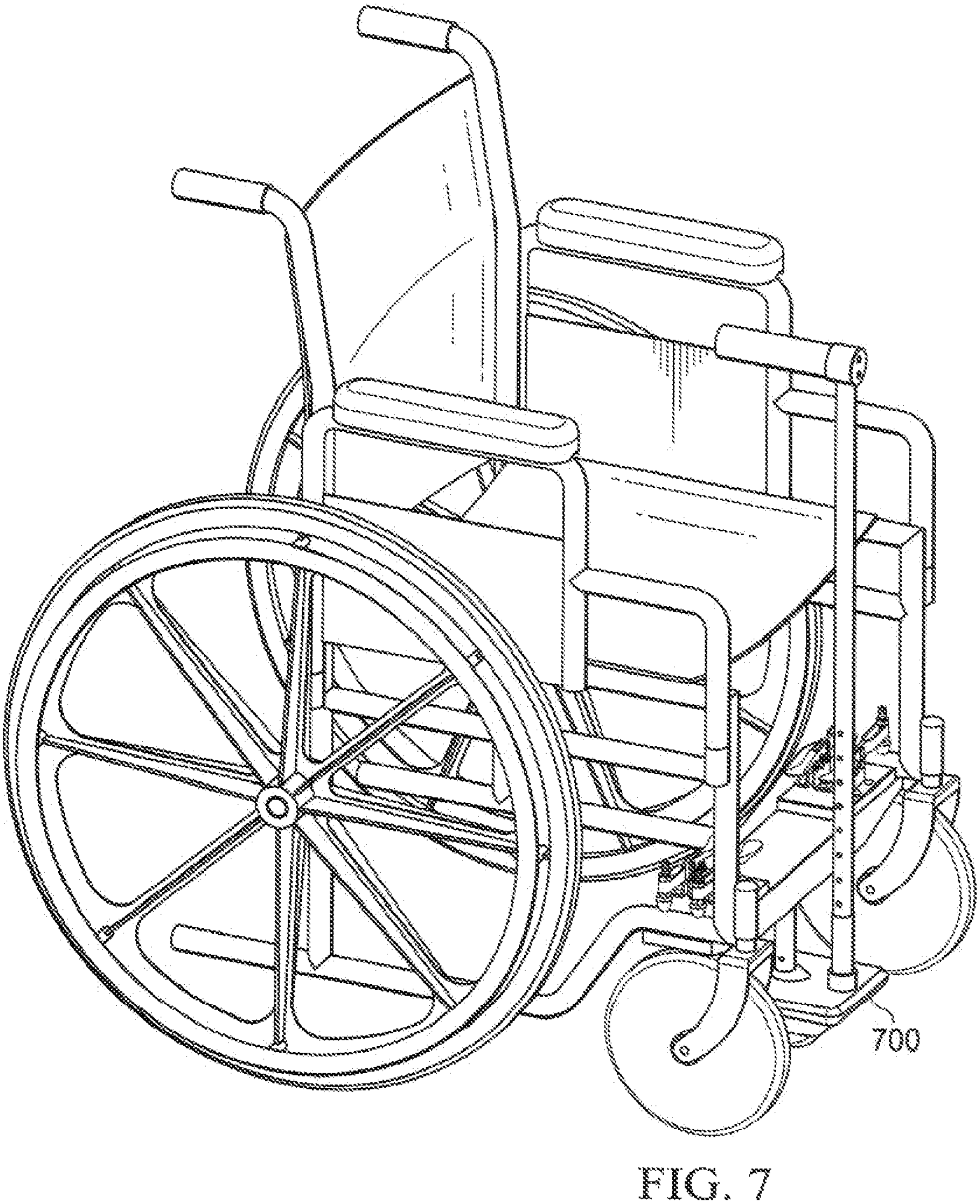
FIG. 7 is a front perspective view of the tractor driven assisted mobility system attached to a manual folding wheelchair in a secondary embodiment of the present invention.

In an embodiment, said self-leveling platform further comprises a plurality of drive wheels or larger in-hub motor to accommodate heavier operators. Referring to FIG. 7, additional embodiments may also reposition the platform 700 such that it is more in line with the existing front caster wheels of the wheelchair, reducing the large stresses on load-bearing components caused by the longer moment arm of the preferred embodiment. In another embodiment, said self-leveling platform further comprises a parking rest extending from said platform housing such that said platform can rest on the ground at a small tilt angle when powered off.

In an embodiment of the present invention, the method for providing mobility to a manual wheelchair comprises the following steps:

1. The operator or an assisting individual first adjusts and affixes said universal adapter bracket 101 to said manual wheelchair.
2. The operator then sits in said wheelchair, places said platform in front of the wheelchair and tilts said platform toward the wheelchair, and then couples said platform to said universal adapter bracket via the latching mechanism and latching assembly. Specifically, the latching assembly is aligned with the latching mechanism as shown in FIG. 3*a*. The latching axles are then moved forward into the latching mechanism until they are captured.
3. The operator then attaches said control stick to said self-leveling platform by aligning the control stick hollow cylindrical length with the platform solid cylinder extrusion, depressing the spring-loaded pin, joining the control stick and platform to the desired height, and then rotating said control stick until said spring-loaded pin is aligned with a control stick through hole.
4. Using the control stick as a lever, the operator tilts the combined control stick and platform forward, lifting the front caster wheels of the wheelchair slightly off the ground and transferring the portion of the weight usually carried by said caster wheels to the platform single drive wheel via the latching axles.
5. By pushing the control stick away, the operator tilts the platform forward. The platform then attempts to restore a level orientation by commanding forward motion of the platform. This forward motion of the platform causes the control stick to rotate toward the operator which must be countered by a force exerted by the operator on the control stick in order to keep the platform tilted forward and the platform controller commanding forward motion. The operator is thus able to control forward and backward movement by tilting and maintaining the control stick in the desired direction.
6. The operator is able to change the direction the wheelchair is facing by rotating the control stick left or right in yaw and then tilting the control stick forward. The wheelchair is then pulled by the platform and rotated in the desired direction.
7. Once the maintaining force on the control stick is released by the operator, allowing the platform to come to a level horizontal orientation, commanded drive wheel speed approaches zero and wheelchair movement stops.

The invention comprises a system, having a universal adapter bracket; a manual wheelchair; a powered self-leveling platform; and a control stick, wherein said universal adapter bracket is coupled to said manual wheelchair; said powered self leveling platform is coupled to said universal adapter bracket: and said control stick is coupled to said powered self-leveling platform. The platform comprises a platform housing, a drive wheel coupled to a drive motor, a microprocessor coupled to nonvolatile memory, sensors, battery, and associated electrical connections, and power distribution and signal conditioning circuits; said drive wheel being positioned beneath the center of mass of the combined platform and control stick such that it extends from the lower surface of said platform housing. The platform further comprises a wireless signal receiver, said wireless signal receiver being coupled to a wireless signal transmitter located on the control stick using a communications protocol, from the group consisting of WiFi, Bluetooth, Zigbee, near field and private wireless. The platform microprocessor is configured to execute sequential instructions stored in nonvolatile memory in the form of computer code operable to: read sensor values, estimate platform orientation and rotation rates, compute corrective drive wheel speed and direction needed to achieve and/or maintain a level platform orientation, and command said corrective drive wheel speed and direction. The platform further comprises a latching mechanism and said bracket further comprises a latching assembly; said platform and said bracket being securely attachable via said latching mechanism and said latching assembly. The platform latching mechanism comprises a pair of gravity or spring-assisted latches positioned on either side of said control stick, each having an associated latch pawl coupled to its respective latch by a pivot, said pawls being joined to each other by a common yoke band such that said pawls are raised and lowered in unison. The self-leveling platform further comprises a bearing assembly coupling the platform housing upper surface to the platform latching mechanism, said bearing assembly allowing said latching mechanism to rotate independently of said platform, said bearing assembly comprising an opening through its middle dimensioned to allow the control stick to pass through, said control stick being rigidly fixed to said platform. The universal adapter bracket further comprises at each lateral end one or more toggleable attachment mechanisms such as a clamp operable to securely attach said bracket to the frame of said wheelchair. The universal adapter bracket toggleable attachment mechanisms each comprise a backstop, said backstop comprising a lateral extension dimensioned to fit underneath a segment of wheelchair frame, and a levered toggle clamp, each clamp comprising a rubber stopper coupled to a handle via a lever mechanism, said handle operable when pressed to securely clamp said wheelchair frame segment between said rubber stopper and said backstop. The universal adapter bracket further comprises one or more securable sliding mechanisms operable to adjust the lateral extent of said bracket such that said bracket is usable with manual wheelchairs of different sizes. Each of said securable sliding mechanisms comprises sliding frames dimensioned to fit one inside the other, the inner frame being partially inserted into the outer frame, such that a portion of the frames overlaps, said inner and outer frames having lengthwise slotted cutouts through which a securing nut and bolt is placed and tightened, preventing relative movement of the inner and outer frames, the bracket lateral extent being determined by the extent of the frame overlap. The platform latching mechanism comprises a pair of gravity or spring-assisted latches positioned on either side of said control stick, each having an associated latch pawl coupled to its respective latch by a pivot, said pawls being joined to each other by a common yoke band such that said pawls are raised and lowered in unison; and said bracket latching assembly is positioned laterally in the center of said bracket and comprises a pair of mirrored latching axle support arms extending forward, said latching axle support arms being coupled to said bracket at a common pivot joint, said bracket latching assembly further comprising on each support arm a latching axle extending laterally outward. The bracket latching assembly further comprises a latching axle adjustment mechanism coupled to said support arms at a common pivot joint, said adjustment mechanism being a threaded bolt coupled to a knob, said bracket further comprising a hole having inner threading and being dimensioned to receive said threaded bolt, said adjustment mechanism being operable to raise or lower said latching axle support arms when said knob is rotated. The control stick comprises at its upper end a handle. The control stick handle is dimensioned as a tee-bar having legs extending laterally and a leg extending backwards. The control stick further comprises controls such as a self-leveling platform on/off switch, said controls being located proximate said handle. The control stick further comprises a secondary handle located approximately midway along its length. Further, the control stick comprises for its lower portion a hollow cylindrical length having a plurality of through-holes located at regular intervals axially, the hollow cylindrical length being open at its lower end, and said self-leveling platform comprises a solid cylinder extending upward from its upper surface, said solid cylinder being dimensioned to be received by the control stick hollow cylindrical length and comprising a spring-loaded pin extending outward laterally from the outer surface of said solid cylinder, said spring-loaded pin being located proximate the upper end of said solid cylinder and being dimensioned to fit through the through-holes of said control stick; said control stick being thereby securable to said self-leveling platform. The self-leveling platform comprises a parking rest extending from said platform such that said platform rests at a tilt angle of less than 30 degrees from vertical when powered off. The platform further comprises a wireless signal receiver, said wireless signal receiver being coupled to a wireless signal transmitter located on the control stick using a communications protocol, from the group consisting of WiFi, Bluetooth, Zigbee, near field and private wireless; and the control stick further comprises a wireless transmitter coupled to the platform wireless receiver, a battery and associated power distribution and signal carrying circuitry.

The invention further is a device for providing mobility to a wheelchair, comprising a powered self-leveling platform coupled to a universal adapter bracket, said bracket being coupled to said wheelchair. The self-leveling platform is coupled to said universal adapter bracket by a two-degree of freedom joint allowing said platform to yaw left and right and pitch forward and backward with respect to said bracket. The platform further comprises a platform housing, a detachable control stick, a drive wheel coupled to a drive motor, a microprocessor coupled to nonvolatile memory, sensors, battery, and associated electrical connections, and power distribution and signal conditioning circuits; said drive wheel being positioned beneath the center of mass of the platform such that it extends from the lower surface of said platform housing. The platform further comprises a wireless signal receiver, said wireless signal receiver being coupled to a wireless signal transmitter located on the control stick using a communications protocol such as Bluetooth, Zigbee, near field and private wireless.

The platform microprocessor executes sequential instructions stored in nonvolatile memory in the form of computer code operable to: read sensor values, estimate platform orientation and rotation rates, compute corrective drive wheel speed and direction needed to achieve and/or maintain a level platform orientation, and command said corrective drive wheel speed and direction. The universal adapter bracket further comprises at each lateral end one or more toggleable attachment mechanisms such as a clamp operable to securely attach said bracket to the frame of said wheelchair. The universal adapter bracket toggleable attachment mechanisms each comprise a backstop, said backstop comprising a lateral extension dimensioned to fit underneath a segment of wheelchair frame, and a levered toggle clamp, each clamp comprising a rubber stopper coupled to a handle via a lever mechanism, said handle operable when pressed to securely clamp said wheelchair frame segment between said rubber stopper and said backstop. The universal adapter bracket further comprises one or more securable sliding mechanisms operable to adjust the lateral extent of said bracket such that said bracket is usable with manual wheelchairs of different sizes. The securable sliding mechanisms comprises sliding frames dimensioned to fit one inside the other, the inner frame being partially inserted into the outer frame, such that a portion of the frames overlaps, said inner and outer frames having lengthwise slotted cutouts through which a securing nut and bolt is placed and tightened, preventing relative movement of the inner and outer frames, the bracket lateral extent being determined by the extent of the frame overlap. The control stick comprises at its upper end a handle and is dimensioned as a tee-bar having legs extending laterally and a leg extending backwards. The control stick further comprises controls such as a self-leveling platform on/off switch, said controls being located proximate said handle. The control stick comprises for its lower portion a hollow cylindrical length having a plurality of through-holes located at regular intervals axially, the hollow cylindrical length being open at its lower end, and said self-leveling platform comprises a solid cylinder extending upward from its upper surface, said solid cylinder being dimensioned to be received by the control stick hollow cylindrical length and comprising a spring-loaded pin extending outward laterally from the outer surface of said solid cylinder, said spring-loaded pin being located proximate the upper end of said solid cylinder and being dimensioned to fit through the through-holes of said control stick; said control stick being thereby securable to said self-leveling platform. The platform further comprises a wireless signal receiver, said wireless signal receiver being coupled to a wireless signal transmitter located on the control stick using a communications protocol such as Bluetooth, Zigbee, near field and private wireless and the control stick further comprises a wireless transmitter coupled to the platform wireless receiver, a battery and associated power distribution and signal carrying circuitry.

The invention further comprises a method for providing mobility to a manual wheelchair comprising the steps of coupling a universal adapter bracket to a manual wheelchair; coupling a self-leveling platform to said universal adapter bracket; coupling a control stick to said self-leveling platform; powering on said self-leveling platform; and rotating said control stick to change direction; tilting said control stick forward or rearward to control speed of platform and coupled wheelchair.

The tactile control stick is a staff which acts as an elongated joystick providing tactile feedback to the operator. The control stick, through motion of the tractor platform, resists operator inputs/applied pressure with varying amounts of resistance. The more resistance the control stick has to the operator's applied pressure the greater the acceleration or braking that results. The control stick is a completely mechanical device that provides the operators complete control of speed, direction and braking. The top portion of the control stick is removable allowing the operator easy access to the wheelchair without having to detach the tractor platform from the universal adapter and wheelchair.

The embodiments shown and described above are only exemplary. Even though numerous characteristics and advantages of the present invention have been set forth in the foregoing description, the disclosure is illustrative only and changes may be made within the principles of the invention to the full extent indicated by the broad general meaning of the terms used herein. Various alterations, modifications and substitutions can be made to the disclosed invention and the system that implements the present invention without departing in any way from the spirit and scope of the invention

What is claimed is:

1. A system, comprising:
a universal adapter bracket;
a manual wheelchair;
a powered self-leveling platform; and
a control stick, wherein said universal adapter bracket is coupled to said manual wheelchair;
said powered self leveling platform is coupled to said universal adapter bracket: and
said control stick is coupled to said powered self-leveling platform wherein said platform comprises a platform housing, a drive wheel coupled to a drive motor, a microprocessor coupled to a nonvolatile memory, sensors, battery, and associated electrical connections, and power distribution and signal conditioning circuits; said drive wheel being positioned beneath a center of mass of the combined platform and control stick such that the drive wheel extends from the lower surface of said platform housing and further wherein said platform further comprises a latching mechanism and said bracket further comprises a latching assembly; said platform and said bracket being securely attachable via said latching mechanism and said latching assembly.

2. The system of claim 1, further comprising the drive wheel being positioned beneath a center of mass of the combined platform and control stick such that the drive wheel extends from the lower surface of said platform housing further wherein said platform further comprises a latching mechanism and said bracket further comprises a latching assembly;
said platform and said bracket being securely attachable via said latching mechanism and said latching assembly and wherein said platform latching mechanism comprises a pair of latches positioned on either side of said control stick, each latch having an associated latch pawl coupled thereto by a pivot, said pawls being joined to each other by a common yoke band such that said pawls are raised and lowered in unison.

3. The system of claim 2 wherein said latches are gravity latches and said latch pawls are gravity latch pawls, the restoring force which actuates the latching motion being provided by gravity.

4. The system of claim 2 wherein said latches are spring-assisted latches and said latch pawls are spring-assisted latch pawls, the restoring force which actuates the latching motion being provided by a spring coupling each of said latch pawls to the respective latch.

5. The system of claim 2 wherein said self-leveling platform further comprises a bearing assembly coupling a platform housing upper surface to the platform latching mechanism, said bearing assembly allowing said latching mechanism to rotate independently of said platform, said bearing assembly comprising an opening through a middle portion thereof and dimensioned to allow the control stick to pass through, said control stick being rigidly fixed to said platform.

6. The system of claim 1 wherein said universal adapter bracket further comprises at each lateral end one or more toggleable attachment mechanisms comprising a levered toggle clamp operable to securely attach said bracket to a frame of said wheelchair.

7. The system of claim 6 wherein said universal adapter bracket toggleable attachment mechanisms each comprise a backstop, said backstop comprising a lateral extension dimensioned to fit underneath a segment of wheelchair frame, and the levered toggle clamp the levered toggle clamp comprising a rubber stopper coupled to a handle via a lever mechanism, said handle operable when pressed to securely clamp said wheelchair frame segment between said rubber stopper and said backstop.

8. The system of claim 1 wherein said universal adapter bracket further comprises one or more securable sliding mechanisms operable to adjust the lateral extent of said bracket such that said bracket is usable with manual wheelchairs of different sizes.

9. The system of claim 8 wherein said each of said securable sliding mechanisms comprises sliding frames dimensioned to fit one inside the other, an inner frame being partially inserted into an outer frame, such that a portion of the inner and outer frames overlaps, said inner and outer frames having length-wise slotted cutouts through which a securing nut and bolt is placed and tightened, preventing relative movement of the inner and outer frames, the bracket lateral extent being determined by the extent of overlap of the inner and outer frame.

10. The system of claim 1 wherein said platform latching mechanism comprises a pair of gravity or spring-assisted latches positioned on either side of said control stick, each latch having an associated latch pawl coupled thereto by a pivot, said pawls being joined to each other by a common yoke band such that said pawls are raised and lowered in unison; and
said bracket latching assembly is positioned laterally in the center of said bracket and comprises a pair of mirrored latching axle support arms extending forward, said latching axle support arms being coupled to said bracket at a common pivot joint, said bracket latching assembly further comprising on each support arm a latching axle extending laterally outward.

11. The system of claim 10 wherein said bracket latching assembly further comprises a latching axle adjustment mechanism coupled to said support arms at the common pivot joint, said adjustment mechanism being a threaded bolt coupled to a knob, said bracket further comprising a hole having inner threading and being dimensioned to receive said threaded bolt, said adjustment mechanism being operable to raise or lower said latching axle support arms when said knob is rotated.

12. A system,
comprising:
a universal adapter bracket;
a manual wheelchair;
a powered self-leveling platform; and
a control stick, wherein said universal adapter bracket is coupled to said manual wheelchair;
said powered self leveling platform is coupled to said universal adapter bracket: and
said control stick is coupled to said powered self-leveling platform and wherein said control stick comprises a lower portion a hollow cylindrical length having a plurality of through-holes located at regular intervals axially, the hollow cylindrical length being open at a lower end, and said self-leveling platform comprises a solid cylinder extending upward from an upper surface, said solid cylinder being dimensioned to be received by the control stick hollow cylindrical length and comprising a spring-loaded pin extending outward laterally from the outer surface of said solid cylinder, said spring-loaded pin being located proximate the upper end of said solid cylinder and being dimensioned to fit through the through-holes of said control stick; said control stick being thereby securable to said self-leveling platform.

13. A device for providing mobility to a wheelchair, comprising a powered self-leveling platform coupled to a universal adapter bracket, said bracket being coupled to said wheelchair, wherein said universal adapter bracket further comprises at each lateral end one or more toggleable attachment mechanisms comprising a clamp operable to securely attach said bracket to a frame of said wheelchair further wherein said universal adapter bracket toggleable attachment mechanisms each comprise a backstop, said backstop comprising a lateral extension dimensioned to fit underneath a segment of the wheelchair frame, and a levered toggle clamp, each levered toggle clamp comprising a rubber stopper coupled to a handle via a lever mechanism, said handle operable when pressed to securely clamp the segment of the wheelchair frame between said rubber stopper and said backstop.

14. A device for providing mobility to a wheelchair, comprising a powered self-leveling platform coupled to a universal adapter bracket, said bracket being coupled to said wheelchair, wherein said platform comprises a platform housing, a detachable control stick, a drive wheel coupled to a drive motor, a microprocessor coupled to a nonvolatile memory, sensors, battery, and associated electrical connections, and power distribution and signal conditioning circuits; said drive wheel being positioned beneath a center of mass of the platform such that the drive wheel extends from the lower surface of said platform housing; further wherein said control stick comprises at an upper end a handle, said control stick further comprising controls the controls comprising a self-leveling platform on/off switch, said controls being located proximate said handle, said control stick further comprising for a lower portion a hollow cylindrical length having a plurality of through-holes located at regular intervals axially, the hollow cylindrical length being open at a lower end, and said self-leveling platform comprises a solid cylinder extending upward from an upper surface, said solid cylinder being dimensioned to be received by the control stick hollow cylindrical length and comprising a spring-loaded pin extending outward laterally from the outer surface of said solid cylinder, said spring-loaded pin being located proximate the upper end of said solid cylinder and being dimensioned to fit through the through-holes of said control stick; said control stick being thereby securable to said self-leveling platform.

* * * * *